(12) United States Patent
Dussac

(10) Patent No.: US 6,224,014 B1
(45) Date of Patent: May 1, 2001

(54) DEVICE FOR REDUCING LINE NOISE INSIDE A ROTARY-WING AIRCRAFT, ESPECIALLY A HELICOPTER

(75) Inventor: Marc Dussac, Miramas (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/164,931

(22) Filed: Oct. 1, 1998

(30) Foreign Application Priority Data

Oct. 2, 1997 (FR) ................................................ 97 12259

(51) Int. Cl.$^7$ .................................................. B64C 27/00
(52) U.S. Cl. .......................................................... 244/17
(58) Field of Search ........................ 244/17.27; 310/328; 381/71.1, 71.4, 71.14; 702/195

(56) References Cited

U.S. PATENT DOCUMENTS

| | | | |
|---|---|---|---|
| 2,361,071 | * 10/1944 | Vang | 244/1 R |
| 4,562,589 | * 12/1985 | Warnaka et al. | 381/71.4 |
| 4,600,863 | * 7/1986 | Chaplin et al. | 318/114 |
| 4,819,182 | * 4/1989 | King et al. | 364/508 |
| 5,310,137 | * 5/1994 | Yoerkie, Jr. et al. | 244/17.27 |
| 5,386,689 | * 2/1995 | Bozich et al. | 60/39.33 |
| 5,440,193 | 8/1995 | Barrett | 340/328 |
| 5,526,292 | 6/1996 | Hodgson et al. | 364/574 |
| 5,626,312 | * 5/1997 | Head | 244/75 R |
| 5,845,236 | * 12/1998 | Jolly et al. | 702/195 |
| 5,907,211 | * 5/1999 | Hall et al. | 310/328 |

OTHER PUBLICATIONS

French Search Report dated Jun. 17, 1998, 3 pages.

* cited by examiner

*Primary Examiner*—Charles T. Jordan
*Assistant Examiner*—Francis T. Palo
(74) *Attorney, Agent, or Firm*—Marshall, O'Toole, Gerstein, Murray & Borun

(57) ABSTRACT

The present invention relates to a device for reducing the noise inside a rotary-wing aircraft, especially a helicopter.

According to the invention, said device (1) comprises at least one sensor (Ca, Cb) for measuring the values of at least one vibrational and/or acoustic parameter representing a vibrational and/or acoustic effect of at least one source of noise, at least one mechanical means (A) that can be controlled and is capable of creating a force capable of reducing said vibrational and/or acoustic effect, and a control unit (UC) for controlling the mechanical means (A), on the basis of the values measured by the sensor (Ca, Cb).

13 Claims, 2 Drawing Sheets

DEVICE FOR REDUCING LINE NOISE INSIDE A ROTARY-WING AIRCRAFT, ESPECIALLY A HELICOPTER

BACKGROUND OF THE INVENTION

The present invention relates to a device for reducing the line noise inside a rotary-wing aircraft, especially a helicopter.

More specifically, it applies to the reducing of noise in the flight deck and/or the passenger cabin of said aircraft.

It is known that, in a rotary-wing aircraft of this type, the acoustic spectra defined in the range between 20 Hz and 20 kHz are the result of the superposition of noises of differing origins, which can be categorized into two different groups depending on their spectral characteristics, namely pure sounds, or line noises, and broadband noises.

As is known, pure sounds or line noise, in particular, arise, as appropriate:
at the characteristic frequencies of the aircraft drivetrain;
at the rotational frequencies of the rotor blades (main and tail rotor) and at the harmonics of these frequencies;
at the rotational frequencies of the turbine engine compressor blades; and/or
at the rotational frequencies of the fanblades of the fans that cool the main gearbox and/or electrical equipment, and at the harmonics of these frequencies,
whereas broadband noises include, in particular, and as appropriate:
the noise of the boundary layer developing on the fuselage;
the noise generated by the rotors;
the airflow noise from the air intakes and jet pipes;
the engine noise; and/or
the noise of the circuits for air-conditioning or heating of the flight deck or the passenger cabin.

All these noises are of course annoying to pilots and passengers.

Thus, there are various known solutions for reducing such noises inside a rotary-wing aircraft, especially a helicopter.

DESCRIPTION OF THE PRIOR ART

A first known solution is aimed at reducing the level of vibration or the radiation of sources of noise and/or of the fuselage. To do this, there are various physical actions that can be taken, in particular:
reducing the vibration of the structure and/or of mechanical components, by damping or modifying the stiffness or the mass;
attenuating the acoustic transmission, by deadening or modifying the stiffness or the mass;
a double-skin effect, by shrouding the target source;
acoustic absorption using fibrous or cellular material; and
acoustic absorption using Helmholtz resonators.

The first four physical actions mentioned above allow the overall noise level to be reduced in a broad range of frequencies, but they lead to a significant and highly disadvantageous increase in mass. Furthermore, the noise reduction obtained is not selective enough to cause the acoustic annoyance specific to pure sounds to disappear.

By contrast, the fifth and last physical action mentioned above does effectively allow the line noise to be reduced, but still only in a narrow band of frequencies defined by design.

This first abovementioned solution based on a passive treatment of the noise is therefore barely effective, especially for line noises generated by vibrational excitations.

A second known solution recommends that passive soundproofing be created in the form of lining panels mounted in the flight deck or in the passenger cabin. These panels are designed to suit the structural area to be treated and the spectrum of frequencies to be attenuated.

However, this second solution also has numerous drawbacks, and in particular:
a noise reduction that is limited especially at low frequencies;
a high increase in mass, which may be by several hundred kilograms in the case of a large-sized helicopter;
a not insignificant loss of space, especially when using thick panels with a view to increasing the acoustic absorption effect; and
acoustic leaks, particularly at the wiring lead-throughs and joints between the panels.

Thus, neither of these two known and aforementioned solutions is satisfactory in reducing the annoyance caused by the line noises.

It is also known that the existing and very great acoustic annoyance to passengers and crew is caused essentially by the line noises.

Thus, to reduce this acoustic annoyance, it is above all advisable to reduce said line noises. This is what the present invention sets out to achieve, another object of this invention being to overcome the aforementioned drawbacks.

SUMMARY OF THE INVENTION

To this end, the invention relates to a device of low mass, cost and bulk which allows an effective and significant reduction in noise, and more particularly line noise, inside a rotary-wing aircraft, especially a helicopter, it being possible in addition for said device to be applied to any type of rotary-wing aircraft, and for its action to be modified and adapted during flight to the prevailing flight conditions.

To this end, said device is noteworthy, according to the invention, in that it comprises:
at least one sensor for measuring the values of at least one vibrational and/or acoustic parameter representing a vibrational and/or acoustic effect of at least one source of noise of said aircraft;
at least one mechanical means that can be controlled and is capable of creating a force capable of reducing the vibrational and/or acoustic effect of said source of noise; and
a control unit for controlling said mechanical means on the basis of the values measured by said sensor.

Thus, by virtue of the invention, it becomes possible to adapt said noise-reduction device to the flight conditions by controlling said mechanical means.

In addition, owing to the low number of constituent parts, the device in accordance with the invention is not very bulky, not very heavy and not very expensive. Furthermore, as its constituent parts are independent of the aircraft, said device can be produced in the form of an optional "add-on extra" control unit which can be mounted on any type of rotary-wing aircraft.

Furthermore, said device is capable of reducing all the annoying line noise likely to exist, irrespective of its frequency, especially below 10 kHz.

According to the invention, said sensor or sensors are preferably accelerometers, strain gauges, special-purpose sensors capable of measuring a strain, a speed, an acceleration, a force or a displacement, or microphones, or alternatively a combination of these various means.

In the first three instances, each accelerometer, strain gauge or special-purpose sensor is preferably fixed to:
at least one engine fixing mount;
one or more bearing(s) in the aircraft drivetrain;
one or more bar(s) for fixing the main gearbox;

a mechanical suspension of said main gearbox;
the aircraft fuselage;
a device for fixing lining panels to the structure; or
a panel for lining the flight deck.

Furthermore, in the fourth instance, said microphone or microphones is or are advantageously installed at the point where it is mainly a reduction in noise that is to be obtained, mainly preferably close to the heads of the pilots and passengers or beneath the ceiling of the helicopter.

Furthermore, said mechanical means, which is preferably a piezoelectric actuator or a magnetostrictive actuator or an actuator using shape-memory materials, advantageously acts on:
one or more mount(s) for fixing said engine to the fuselage of the aircraft;
one or more bearing(s) in said drivetrain;
one or more bar(s) for fixing said main gearbox to the fuselage;
a mechanical suspension of said main gearbox;
the aircraft fuselage; or
a device for fixing lining panels.

Furthermore, said control unit advantageously uses reference values to determine the commands for controlling said mechanical means. As a preference, said reference values comprise at least some of the following values:
values measured by one or more accelerometer(s) arranged on:
 a casing of a gearbox;
 a bearing in the drivetrain;
 a mount for fixing the engine to the fuselage;
 a bar for fixing the main gearbox to the fuselage; and
 a mechanical suspension of the main gearbox; and/or
values measured by one or more microphone(s) arranged in a cargo hold or in the compartment in which the main mechanical-power gearbox is located.

Furthermore, in a particularly advantageous embodiment of the invention, said device comprises P sensors Cp arranged at points Mp, P being a predefined integer and p being an integer between 1 and P, which sensors are capable of measuring one same acoustic and/or vibrational parameter, and Q mechanical means Aq, Q being a predefined integer and q being an integer between 1 and Q, these means being capable respectively of creating forces capable of reducing one same vibrational and/or acoustic effect, and said control unit repeatedly performs the following succession of operations:
it calculates, for each of the P sensors Cp, a value P1p that satisfies the equation:

$$P1p = P2p + \Sigma q(Tq, p \cdot P3q),$$

q varying from 1 to Q,
in which:
P2p corresponds to the value of said vibrational and/or acoustic parameter which exists at the point Mp in the absence of action of said device and which depends on the value measured by the sensor Cp;
P3q is the value of said vibrational and/or acoustic parameter due to the action of the mechanical means Aq and depending on the control of said mechanical means Aq; and
Tq,p is a transfer value relating the value of said parameter that exists at the mechanical means Aq to the corresponding one that exists at the point Mp;
it calculates the sum:

$$\Sigma p |P1p|^2,$$

p varying from 1 to P; and it minimizes the above sum in order to deduce therefrom the commands for controlling said Q mechanical means Aq, which commands are sent to these means.

In this case, advantageously:
in a first alternative form, said sensors Cp are microphones and the values P1p represent acoustic pressures;
in a second alternative form, the sensors Cp are accelerometers and the values P1p represent accelerations;
in a third alternative form, the sensors Cp are sensors capable of measuring a strain, a force, a displacement, a speed or an acceleration; and
in a fourth alternative form, at least two of the previous three alternative forms are combined.

In addition, as the forces generated by the mechanical means are difficult to access, the values P3q advantageously represent accelerations or other vibrational magnitudes (strain, force, displacement, speed, . . . ) which can themselves be easily measured.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENTS

Figure 1:
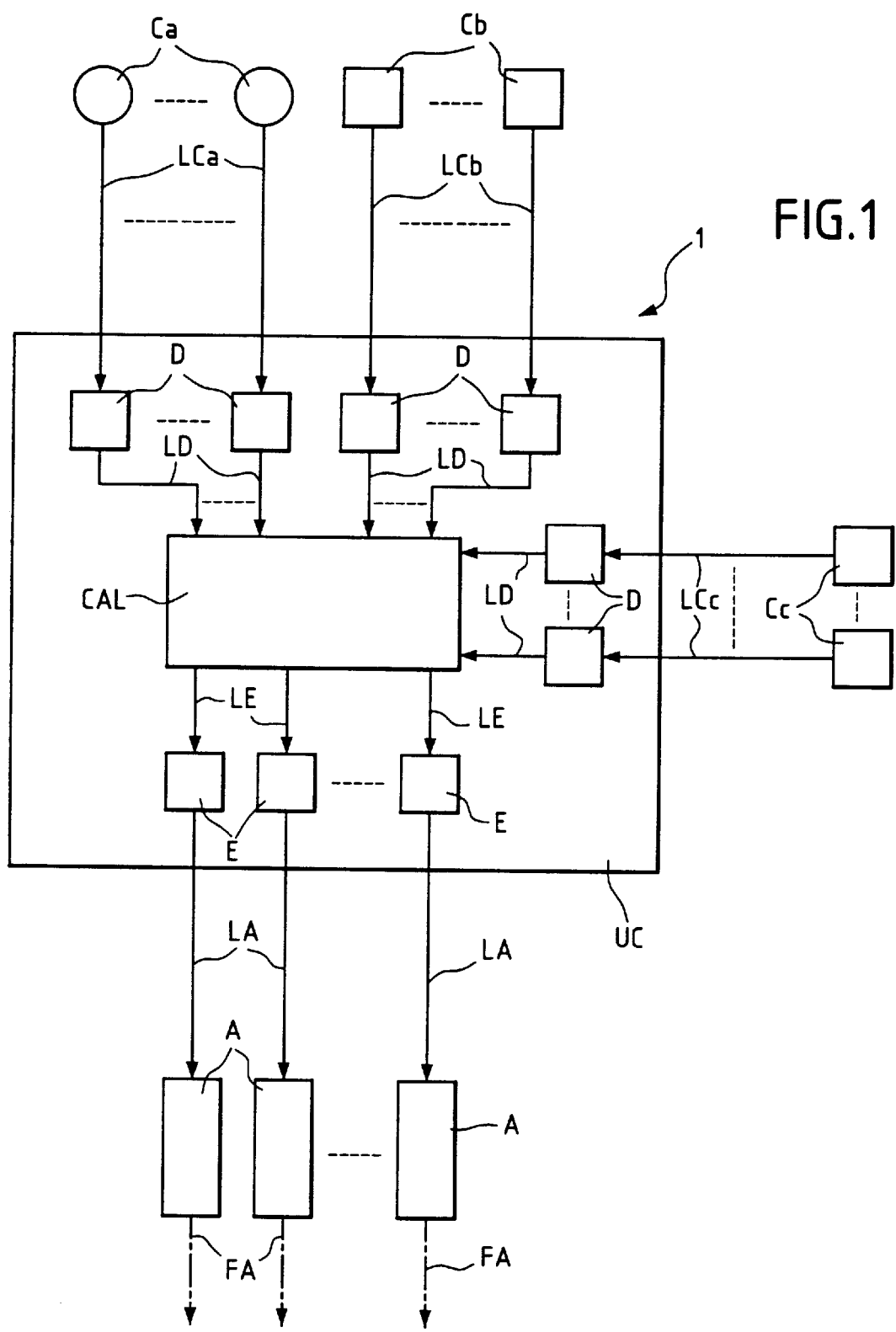
FIG. 1 is the block diagram of a device in accordance with the invention.

The device 1 in accordance with the invention and depicted diagrammatically in FIG. 1 is intended to reduce the noise inside a rotary-wing aircraft, especially a helicopter, not depicted, and more particularly the line noise.

Such line noise is generated, as is known, by the operation of rotating components (for example a pair of meshing gears, a bearing, a fan, a compressor, a rotor, . . . ) and depends on the mechanical-power transmission conditions (torque, rotational speed, lubrication, conditions for attachment to the structure or connection with other rotating parts).

More specifically, the device 1 in accordance with the invention is intended to reduce the noise inside the flight deck and/or passenger cabin, where it is the most annoying.

To this end, said device 1 comprises, according to the invention:
a number of sensors Ca and Cb specified hereinbelow, capable of measuring the values of at least one vibrational and/or acoustic parameter representing the vibrational and/or acoustic effects of sources (not depicted and specified hereinbelow) of noise of said aircraft;
a number of mechanical means A that can be controlled and are also specified hereinbelow, said mechanical means A being capable of creating forces capable of reducing the vibrational and/or acoustic effects of said sources of noise, as illustrated by arrows FA in chain line. For this, the number and location of said mechanical means A are chosen, as explained hereinbelow, in such a way as to obtain the greatest possible reduction; and
a control unit UC connected via links LCa, LCb and LA respectively to the sensors Ca, to the sensors Cb and to the mechanical means A, which is capable of calculating the commands for controlling said mechanical means A on the basis of the values measured by said sensors Ca and Cb, and of sending the control commands thus calculated to said mechanical means A. Said control unit UC determines said commands in such a way as to obtain the greatest possible noise reduction, as specified hereinbelow.

Thus, by virtue of the invention, a reduction device 1 is obtained which is active, that is to say, the noise-reduction action of which can be modified and adapted constantly to suit the prevailing (especially flight) conditions, because the control unit UC determines the control commands in real time and in so doing uses measured actual values.

Said device 1 exhibits many other advantages which are specified hereinbelow.

Figure 2:
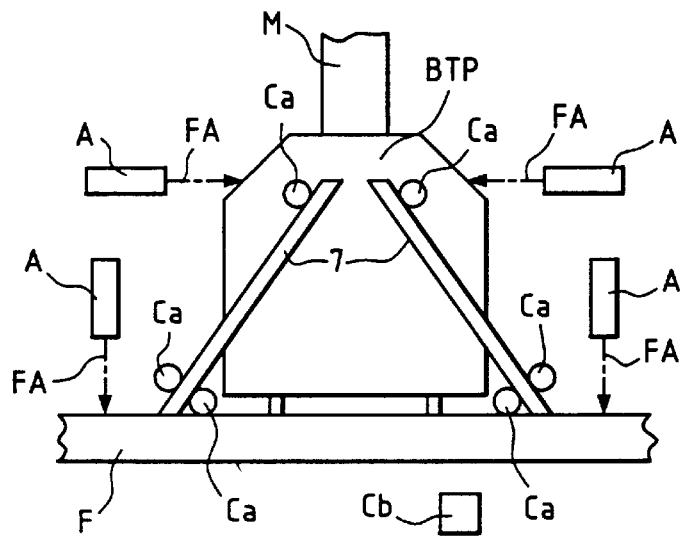
FIG. 2 illustrates in part a first embodiment of the invention.
Figure 3:
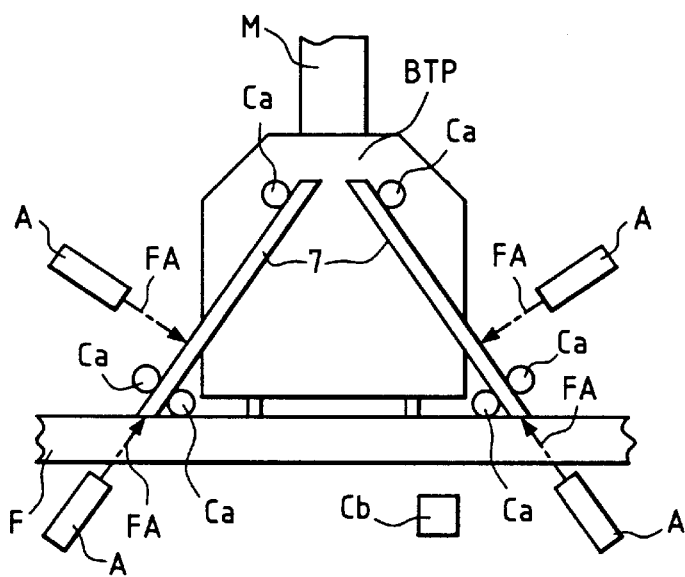
FIG. 3 illustrates in part a second embodiment of the invention.
Figure 4:
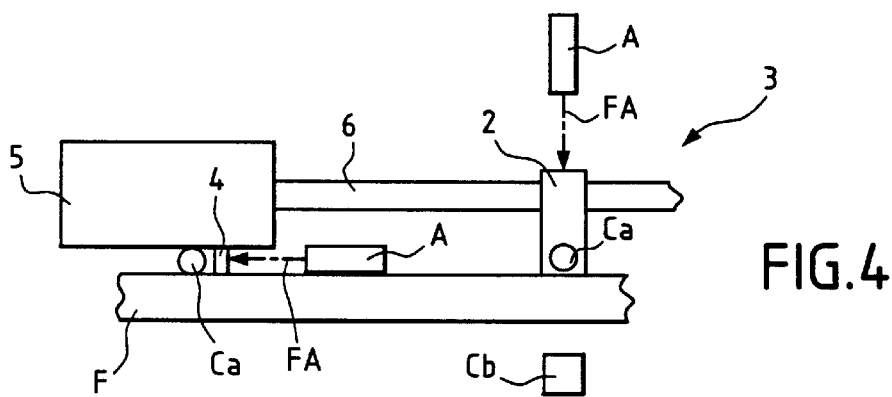
FIG. 4 illustrates in part a third embodiment of the invention.

According to the invention, said sensors are:
accelerometers Ca or sensors capable of measuring a strain, a force, a displacement or a speed, and which may be arranged on:
   a bearing 2 in the drivetrain 3 illustrated in FIG. 4 of the aircraft; and/or
   a mount 4 for fixing an engine 5 of the aircraft, as also depicted in FIG. 4 which also shows an effort-transmission shaft 6; and/or
   a fixing block 7 connecting the main gearbox BTP of the aircraft to the fuselage F, as depicted in FIGS. 2 and 3 which also partially show the mast M of the main rotor that provides said aircraft with lift and propulsion; and/or
   the mechanical suspension of the main gearbox BTP; and/or
   the structure of the fuselage F; and/or
   a device for fixing lining panels, not depicted; and/or
   panels, not depicted, for lining the aircraft flight deck; and
microphones Cb which may be installed;
   in the passenger cabin, as depicted in FIGS. 2 to 4, underneath the fuselage F; and/or
   in the aircraft flight deck, not depicted.

As a preference, said microphones Cb are arranged at the points where the greatest noise reduction is to be obtained, that is to say, in particular, close to the heads of the passengers and pilots of the aircraft.

Furthermore, the mechanical means A are, according to the invention, electromechanical actuators of the piezoelectric or magnetostrictive type, or ones based on shape-memory materials.

Each of said mechanical means A is mounted rigidly on the aircraft, so that it can generate a bending, tension-compression or shear force, or a bending or torsional moment, without creating an additional mode in the range of frequencies that is to be controlled by this mechanical means A.

The purpose of these mechanical means A is for each one of them to create:
when associated with microphones Cb, forces which, via the existing mechanical couplings, force the walls of the fuselage or, as appropriate, the lining panels, to behave like loudspeakers, whose radiation into the flight deck or passenger cabin counters the acoustic effect generated by the corresponding source of noise; or
when associated with accelerometers Ca, forces which allow the vibrational effect of an indirect source of noise (or source of vibration) to be reduced directly or allow its vibrational transfer to other mechanical parts of the aircraft to be reduced.

Of course, instead of having both sensors Ca and sensors Cb, the device 1 in accordance with the invention may just as easily comprise, as an alternative, only sensors Ca and the associated mechanical means A, or only sensors Cb and the associated mechanical means A.

Said mechanical means A are installed, according to the invention, so that they act, in particular:
on the casing of the main gearbox BTP and the mechanical suspension thereof, as illustrated in FIG. 2; and/or
either longitudinally or orthogonally on the bars 7 that fix said main gearbox BTP to the fuselage, as shown in FIG. 3; and/or
on a mount 4 for securing the engine 5, as depicted in FIG. 4; and/or
on a bearing 2 in the drivetrain 3, as also depicted in FIG. 4; and/or
on the device, not depicted, for fixing lining panels; and/or
on the mechanical suspension of the main gearbox BTP.

Furthermore, the control unit UC, whose method of calculation in accordance with the invention will be described later, comprises, according to the invention:
analog/digital converters D connected, respectively via the links LCa, LCb and the links LCc, to the sensors Ca, Cb and to sensors Cc specified hereinbelow;
digital/analog converters E connected to the links LA; and
a computer CAL which is connected to the converters D and E respectively via links LD and LE and which calculates the commands for controlling the mechanical means A.

According to the invention, in the instance in which the device 1 comprises P sensors Cp arranged at points Mp, P being a predefined integer and p being an integer between 1 and P, which are capable of measuring one same acoustic and/or vibrational parameter, and Q mechanical means Aq, Q being a predefined integer and q being an integer between 1 and Q, these means being capable respectively of creating forces capable of reducing one same vibrational and/or acoustic effect, in order to determine said commands for controlling said mechanical means A, said computer CAL repeatedly performs the following succession of operations:
it calculates, for each of the P sensors Cp, a value P1p that satisfies the equation:

$$P1p = P2p + \Sigma q(Tq, p \cdot P3q),$$

q varying from 1 to Q,
in which:
P2p corresponds to the value of said vibrational and/or acoustic parameter which exists at the point Mp in the absence of action of said device 1 and which depends on the value measured by the sensor Cp;
P3q is the value of said parameter which is due to the action of the mechanical means Aq and which depends on the control of said mechanical means Aq; and
Tq,p is a transfer value relating to the value of said parameter that exists at the mechanical means Aq to the corresponding one that exists at the point Mp;
it calculates the sum:

$$\Sigma p |P1p|^2,$$

p varying from 1 to P; and
it minimizes the above sum in order to deduce therefrom the commands for controlling said Q mechanical means Aq.

The calculation mode specified hereinabove, and which is based on an overall reduction in noise (the minimizing of the aforementioned sum), in order to determine the commands for controlling the mechanical means A, can also be used, according to the invention, to choose the location (and possibly the number) of mechanical means A in the aircraft.

In a particularly advantageous embodiment, said computer CAL also uses, in order to refine its calculations, the values measured by reference sensors Cc which are:

either produced in the form of accelerometers arranged on non-rotating parts of high mechanical rigidity of the aircraft;

or produced in the form of microphones arranged in cavities where the level of noise is almost independent of the action exerted by the device 1 in accordance with the invention, namely, as a preference, in the cargo hold or close to the main gearbox BTP.

More specifically, said reference accelerometers may be arranged on:

a casing of a gearbox;
a bearing in the drivetrain;
a mount for fixing the engine to the fuselage;
a bar for fixing the main gearbox to the fuselage; and
a mechanical suspension of the main gearbox.

Thus, by virtue of the invention, said device 1 can reduce noise, the frequency of which corresponds to the fundamental and to the first harmonics:

of the epicyclic stage or stages,
of pairs of bevel and spiral bevel gears, and
of pairs of straight-cut spur or helical gears.

Thus, the range of frequencies for which reduction is possible is:

the fundamental meshing frequency of each pair of gears in the complete drivetrain and in the epicyclic stage or stages of the main gearbox BTP, and their harmonics (frequencies which are multiples of the fundamental), and
the meshing frequencies and their harmonics modulated by the rotational frequencies and their first harmonics of the shafts carrying these gears.

It is known that the meshing noise comes from parts of the aircraft which have gears, namely:

the main, rear and intermediate gearboxes;
the auxiliary gearbox known by the name of remote auxiliary gearbox;
the auxiliary power units for the electrical equipment; and
the gears in the hydraulic units and in the pumps.

Thus, in addition to the aforementioned advantages, the device 1 in accordance with the invention exhibits many other advantages, namely, in particular:

the fact that its constituent parts are independent of the build of the aircraft;
the possibility of producing it in the form of an optional "add-on extra" unit which can be mounted on any type of rotary-wing aircraft;
the advantage that any problem or breakdown of the device 1 which brings about a drop in acoustic efficiency has no impact on the functioning of the aircraft and leads merely to an increase in internal noise to the level that existed previously in the absence of control;
the possibility of reducing or, as appropriate, dispensing with the soundproofing produced in the form of lining panels, which generally are of great mass; and
the insensitivity of the active control achieved using the device 1 to inevitable acoustic leaks (leadthroughs for electric wiring, light fittings, ( . . . ).

What is claimed is:

1. A rotary-wing aircraft, comprising:
an engine;
a main gearbox;
a drivetrain;
a flight deck;
a fuselage;
a number of sensors for measuring the values of at least one vibrational and/or acoustic parameter representing a vibrational and/or acoustic effect of at least one source of noise of said aircraft;
a number of mechanical means which can be controlled and capable of creating a force capable of reducing the vibrational and/or acoustic effect of said source of noise; and
a single control unit for controlling said mechanical means on the basis of the values measured by said sensors, wherein said sensors are fixed to at least some of the following parts of said aircraft:
a mount for fixing said engine to said fuselage of said aircraft;
a bearing in said drivetrain;
a bar for fixing said main gearbox to said fuselage;
a mechanical suspension of said main gearbox;
said fuselage of said aircraft;
a device for fixing lining panels of said aircraft; and
a panel for lining said flight deck,
wherein the aircraft comprises P sensors Cp arranged at points Mp, P being a predefined integer and p being an integer between 1 and P, which sensors are capable of measuring one same vibrational and/or acoustic parameter, and Q mechanical means Aq, Q being a predefined integer and q being an integer between 1 and Q, these means being capable respectively of creating forces capable of reducing one same vibrational and/or acoustic effect, and wherein said control unit repeatedly performs the following succession of operations:
it calculates, for each of said P sensors Cp, a value P1p that satisfies the equation:

$$P1p = P2p + \Sigma q(Tq, p. P3q),$$

q varying from 1 to Q, in which:
P2p corresponds to the value of said vibrational and/or acoustic parameter which exists at the point Mp in the absence of device action and which depends on the value measured by the sensor Cp;
P3q is the value of said vibrational and/or acoustic parameter due to the action of the mechanical means Aq and depending on the control of said mechanical means Aq; and
Tq,p is a transfer value relating to the value of said parameter that exists at the mechanical means Aq to the corresponding one that exists at the point Mp;
it calculates the sum:

$$\Sigma p |P1p|^2,$$

p varying from 1 to P; and
it minimizes the above sum in order to deduce therefrom the commands for controlling said Q mechanical means Aq, which commands are sent to these means.

2. The aircraft as claimed in claim 1, wherein at least one of said sensors is capable of measuring at least one of the following parameters: an acceleration, a strain, a force, a displacement and a speed.

3. The aircraft as claimed in claim 1, wherein at least one of said sensors comprises a microphone.

4. The aircraft as claimed in claim 3, wherein said microphone is installed at the point where a reduction in noise is desired.

5. The aircraft as claimed in claim 1, wherein at least one of said mechanical means comprises a piezoelectric actuator.

6. The aircraft as claimed in claim 1, wherein at least one of said mechanical means comprises a magnetostrictive actuator.

7. The aircraft as claimed in claim 1, wherein at least one of said mechanical means comprises a shape-memory material.

8. The aircraft as claimed in claim 1, wherein said mechanical means act at least on one of the following parts of said aircraft:
- a mount for fixing said engine to said fuselage of said aircraft;
- a bearing in said drivetrain;
- a bar for fixing said main gearbox to said fuselage;
- a device for fixing lining panels of said aircraft;
- a mechanical suspension of said main gearbox; and
- said fuselage of said aircraft.

9. The aircraft as claimed in claim 1, wherein said control unit uses reference values to determine the commands for controlling said mechanical means.

10. The aircraft as claimed in claim 9, wherein said reference values comprise at least some of the following values:
- values of acceleration, strain, force, displacement and/or speed, measured by a sensor arranged on:
  - a casing of said gearbox;
  - a bearing in said drivetrain;
  - a mount for fixing said engine to said fuselage;
  - a bar for fixing said main gearbox to said fuselage; and
  - a mechanical suspension of said main gearbox; and
- values measured by a microphone arranged in a cargo hold of said aircraft.

11. The aircraft as claimed in claim 1, wherein said sensors Cp comprise microphones and the values P1p represent acoustic pressures.

12. The aircraft as claimed in claim 1, wherein said sensors Cp comprise accelerometers and the values P1p represent accelerations.

13. The aircraft as claimed in claim 1, wherein the values P3q represent accelerations.

* * * * *